United States Patent
Kruse et al.

(10) Patent No.: US 8,327,800 B2
(45) Date of Patent: Dec. 11, 2012

(54) PORTABLE LIVESTOCK FEEDER WITH BOTTOM DUMPING AND ADJUSTABLE WIDTH TROUGHS

(75) Inventors: Melvin D. Kruse, Bremen, KS (US); Alan Adam, Hanover, KS (US)

(73) Assignee: A&K Solutions, LLC, Bremen, KS (US)

( * ) Notice: Subject to any disclaimer, the term of this patent is extended or adjusted under 35 U.S.C. 154(b) by 312 days.

(21) Appl. No.: 12/636,727

(22) Filed: Dec. 12, 2009

(65) Prior Publication Data

US 2010/0147223 A1   Jun. 17, 2010

Related U.S. Application Data

(60) Provisional application No. 61/122,191, filed on Dec. 12, 2008.

(51) Int. Cl.
*A01K 1/10* (2006.01)
(52) U.S. Cl. .......................................................... 119/58
(58) Field of Classification Search .................. 298/8 R; 119/52.1, 53, 57, 61.1, 61.2, 57.92, 58, 59; 414/682
See application file for complete search history.

(56) References Cited

U.S. PATENT DOCUMENTS

| 49,003 | A | | 7/1865 | Stansbury | |
|---|---|---|---|---|---|
| 58,529 | A | | 10/1866 | Woodbury | |
| 59,236 | A | * | 10/1866 | Ladd | 119/58 |
| 247,346 | A | | 9/1881 | Hendrick | |
| 335,384 | A | | 2/1886 | Phillips | |
| 769,752 | A | * | 9/1904 | Lawson | 105/263 |
| 1,030,130 | A | * | 6/1912 | Schnieder | 119/51.5 |
| 2,290,042 | A | | 7/1942 | Granville | |
| 2,936,735 | A | | 5/1960 | Smith | |
| 3,824,962 | A | | 7/1974 | Topham | |
| 3,966,255 | A | * | 6/1976 | Licari | 298/35 M |
| 4,072,241 | A | | 2/1978 | Parker et al. | |
| 4,106,813 | A | | 8/1978 | Goodbary | |
| 4,258,663 | A | | 3/1981 | Schoessow | |
| 4,364,333 | A | * | 12/1982 | Touchette | 119/52.4 |
| 4,455,967 | A | * | 6/1984 | Gibbs | 119/58 |
| 5,076,752 | A | | 12/1991 | Rader | |
| 5,324,097 | A | | 6/1994 | Decap | |
| 5,345,895 | A | | 9/1994 | Stevens et al. | |
| 5,595,140 | A | | 1/1997 | Charboneau | |
| 5,909,717 | A | | 6/1999 | Randall | |
| 7,073,460 | B1 | | 7/2006 | Rasmussen et al. | |

* cited by examiner

*Primary Examiner* — Timothy D Collins
*Assistant Examiner* — Brian M O'Hara
(74) *Attorney, Agent, or Firm* — Jeffrey L. Thompson; Thompson & Thompson, P.A.

(57) ABSTRACT

A portable livestock feeder has a frame supported by a plurality of wheels with a trailer hitch at one end. First and second feed troughs are positioned on each side of a longitudinal center of the frame with racks positioned above the troughs. The feed troughs are supported at their front ends by a first pair of pin members and at their rear ends by a second pair of pin members. The feed troughs are pivotable by a hydraulic mechanism about the pin members between a normal feeding position and a bottom dumping position. One of the pin members is movable between first and second stops that limit lateral movement of the feed troughs toward and away from the longitudinal center of the feeder. An adjustable cam member is arranged to engage another one of the pin members for causing the troughs to move between narrow and wide width settings.

23 Claims, 8 Drawing Sheets

PORTABLE LIVESTOCK FEEDER WITH BOTTOM DUMPING AND ADJUSTABLE WIDTH TROUGHS

RELATED APPLICATIONS

This application claims priority of U.S. Provisional Application No. 61/122,191 filed on Dec. 12, 2008. The entire content of this prior application is incorporated herein by reference.

BACKGROUND OF THE INVENTION

1. Field of the Invention

The present invention relates generally to livestock feeders and transport vehicles. In particular, the present invention relates to portable livestock feeders and transport vehicles having a bottom dumping capability and an adjustable width.

2. Description of the Related Art

Portable livestock feeders having a feed trough and a rack positioned above the feed trough are known in the prior art. For example, U.S. Pat. No. 4,258,663 issued to Schoessow, U.S. Pat. No. 5,345,895 issued to Stevens et al., and U.S. Pat. No. 5,595,140 issued to Charboneau, all disclose portable livestock feeders with feed troughs supported by front and rear sets of wheels, and a trailer hitch at the front end for towing the feeder. These conventional livestock feeders also include a rack positioned above the feed troughs to hold hay and other rough feed above the troughs, while allowing animals to access the feed by poking their heads between the bars of the rack.

As these conventional portable livestock feeders are used, feed and waste materials tend to accumulate in the bottom of the troughs and need to be cleaned out periodically. This requires the operator to either scoop out the troughs by hand using a pitch fork or shovel, or to use a loader tractor to tip the feeder completely over to dump the contents.

Another problem with these conventional livestock feeders is that they have a fixed width and are not adjustable to accommodate both young animals (e.g., calves) and full grown animals (e.g., cows). Therefore, the purchaser often must decide between different sizes of feeders depending on whether the feeder will be used primarily for young animals or full grown animals. For example, a six-foot wide feeder might be a more appropriate size for someone who will be feeding calves, while a seven-foot wide feeder might be more appropriate for feeding cows.

There is a need in the industry for an improved portable livestock feeder that overcomes the disadvantages of the conventional livestock feeders described above.

SUMMARY OF THE INVENTION

An object of the present invention is to provide a portable livestock feeder that can be dumped easily to empty waste materials in the bottom of the troughs.

A further object of the present invention is to provide a portable livestock feeder that can be adjusted in width to accommodate different sizes of animals.

A still further object of the present invention is to provide a transport apparatus having a bottom dumping capability.

To accomplish these and other objects of the present invention, a portable livestock feeder is provided having a frame supported by a plurality of wheels with a trailer hitch at one end. First and second feed troughs are positioned on each side of a longitudinal center of the frame with racks positioned above the troughs. The feed troughs are supported at their front ends by a first pair of pin members and at their rear ends by a second pair of pin members. The feed troughs are pivotable by a hydraulic mechanism about the pin members between a normal feeding position and a bottom dumping position. One of the pin members at each end of the feed troughs is movable between respective first and second stops that limit lateral movement of the feed troughs toward and away from the longitudinal center of the feeder. Adjustable cam members are arranged at the ends of the feed troughs to engage pin members for causing the troughs to move between narrow and wide width settings.

According to a broad aspect of the present invention, a livestock feeder is provided, comprising: a feed trough; a rack positioned above the feed trough; and a means for tilting the feed trough between a normal feeding position and a tilted position for dumping out the bottom of the feeder.

According to another broad aspect of the present invention, a portable livestock feeder is provided, comprising: a frame supported by a plurality of wheels with a trailer hitch at one end; first and second feed troughs positioned on each side of a longitudinal center of the frame, the first and second feed troughs being pivotable about respective longitudinal axes between a first position for normal feeding and a second position for bottom dumping; and a mechanism for moving the first and second feed troughs between their first and second positions.

According to another aspect of the present invention, a method of feeding livestock is provided, comprising: providing a livestock feeder having a frame, and first and second feed troughs positioned on each side of a longitudinal center of the frame, the first and second feed troughs being pivotable about respective longitudinal axes between a first position for normal feeding and a second position for bottom dumping; using the feeder with the feed troughs in their first positions to feed livestock; and cleaning out the feeder by pivoting the feed troughs to their second positions to dump the contents of the troughs out the bottom of the feeder.

According to another aspect of the present invention, a bottom dumping transport apparatus is provided, comprising: a frame having a longitudinal center; first and second floor assemblies positioned on each side of the longitudinal center of the frame, the first and second floor assemblies each being supported at their front ends by first pairs of pin members and at their rear ends by second pairs of pin members, the first and second floor assemblies being pivotable about respective longitudinal axes between a first position for normal transport and a second position for bottom dumping; and a mechanism for moving the first and second floor assemblies between their first and second positions.

Numerous other objects of the present invention will be apparent to those skilled in this art from the following description wherein there is shown and described example embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Figure 1:
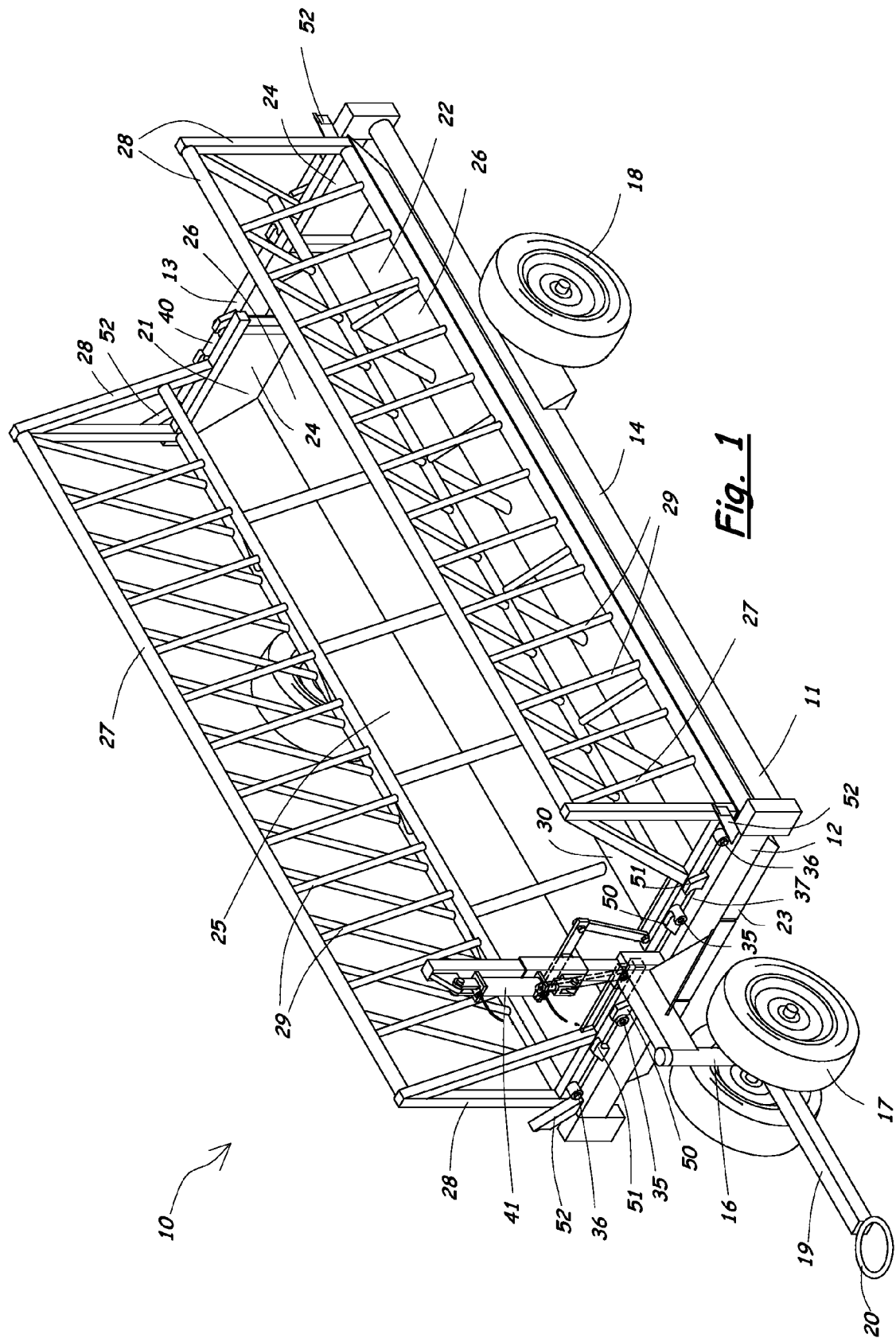
FIG. 1 is a perspective view of a portable livestock feeder according to the present invention.

A portable livestock feeder 10 according to the present invention will now be described in detail with reference to FIGS. 1 to 11 of the accompanying drawings.

The portable livestock feeder 10 has a frame 11 with a front end 12, a rear end 13, and first and second side members 14, 15. A steerable front wheel assembly 16 is connected to the front end 12 of the frame 10. The front wheel assembly 16 includes a pair of front wheels 17 for supporting the front portion of the feeder 10. A pair of rear wheels 18 support the rear portion of the feeder 10. A tongue member 19 with a trailer hitch 20 at its front end is connected to the front wheel assembly 16 for towing the feeder 10.

First and second feed troughs 21, 22 are positioned on each side of a longitudinal center of the frame 11. The feed troughs 21, 22 each have front and rear end walls 23, 24, an outer side wall 25, and a floor 26. The outer side wall 25 and floor 26 of each feed trough 21, 22 extend the length of the trough 21, 22 and provide a structure for holding loose livestock feed or the like in the bottom of the feeder 10.

A rack 27 is positioned above each of the troughs 21, 22. The racks 27 can be rigidly connected to the troughs 21, 22 by suitable support and brace members 28. The racks 27 include a plurality of spaced bars 29 that function to hold hay or other rough feed above the troughs, while allowing animals to access the feed by poking their heads between the bars 29. As the hay is fed, part of the hay and other feed material typically ends up in the troughs 21, 22 at the bottom of the feeder 10.

A center deflector 30 extends along the longitudinal centerline of the feeder 10 between the feed troughs 21, 22. The center deflector 30 has an apex 31 extending in a longitudinal direction of the feeder 10 and tapered side surfaces 32, 33 that extend downwardly and outwardly from the apex 31. The center deflector 30 helps guide the feed outwardly in the feed troughs 21, 22 to keep it more accessible to the animals using the feeder 10. The lower edges 34 of the tapered side surfaces 32, 33 of the center deflector 30 engage the respective floors 26 of the troughs 21, 22 when the troughs 21, 22 are in their normal feeding positions shown in FIGS. 1 to 3.

The feed troughs 21, 22 are supported by pivot structures at the front and rear ends 12, 13 of the frame 11. Specifically, the feed troughs 21, 22 are each supported at their front ends by a pair of front pin members 35, 36 that protrude forward from the front end walls 23 of the troughs 21, 22. The front pin members 35, 36 rest on an upper surface 37 of the front end 12 of the frame 11. The feed troughs 21, 22 are each supported at their rear ends by a pair of rear pin members. The rear pin members are similar to the front pin members 35, 36 and protrude rearward from the rear end walls 13 of the troughs 21, 22. The rear pin members rest on an upper surface 40 of the rear end 13 of the frame 11.

A hydraulic actuator 41 is connected by a linkage 42 to each of the feed troughs 21, 22. An upper end 43 of the hydraulic actuator 41 is connected to a mast 44 that extends upwardly from the front end 12 of the frame 11. A lower end 45 of the hydraulic actuator 41 is connected to a slide member 46 that slides along the mast 44 between a raised position and a lowered position. The linkage 42 includes a cross member 47 rigidly connected to the slide member 46 and a pair of link members 48, 49. The link members 48, 49 are pivotally connected at their upper ends to the outer ends of the cross member 47, and at their lower ends to the respective feed troughs 21, 22. The link members 48, 49 are connected to the feed troughs 21, 22 at locations spaced inwardly from the first pin members 35.

Figure 2:
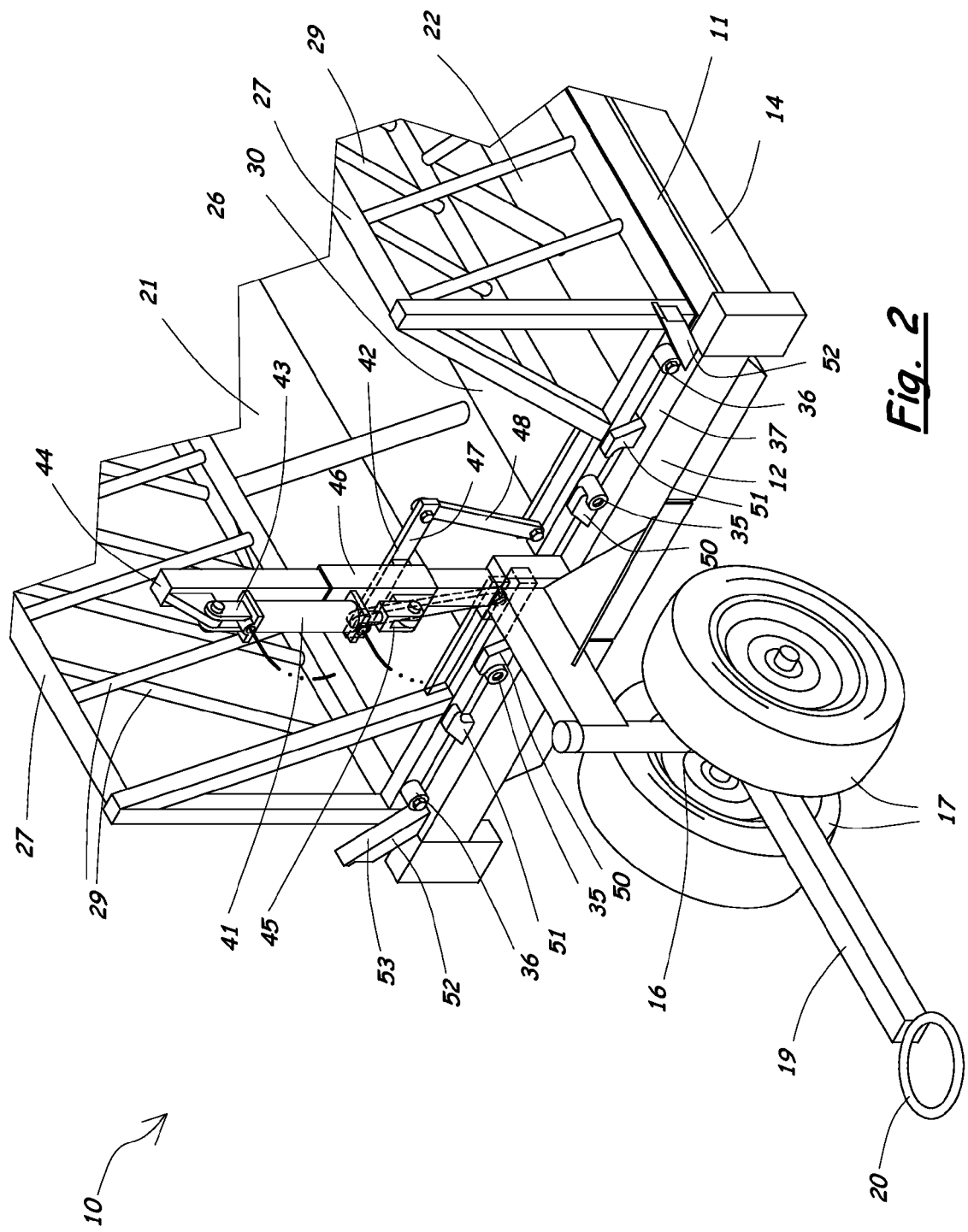
FIG. 2 is a perspective detail view of the front part of the livestock feeder shown in FIG. 1.
Figure 3:
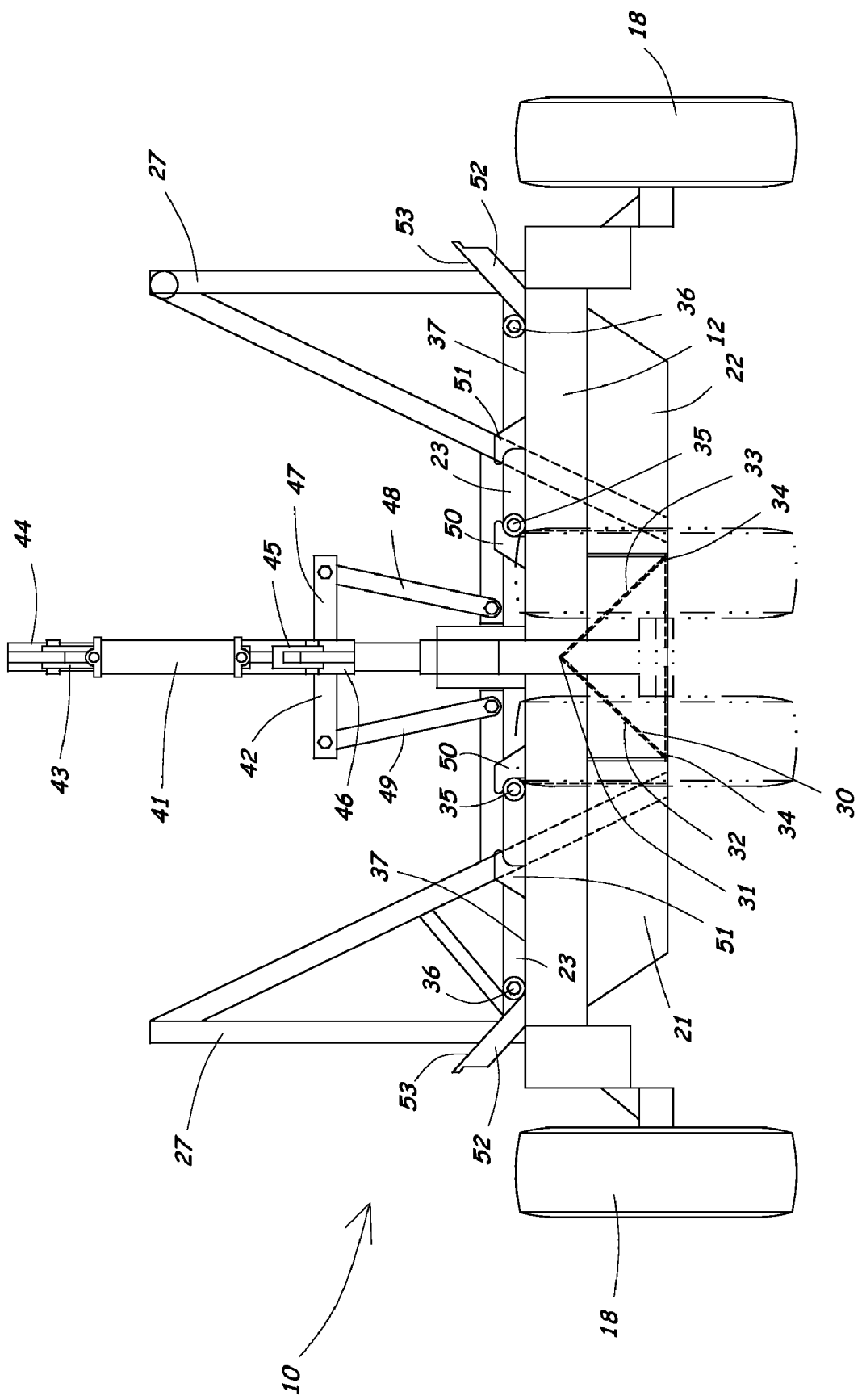
FIG. 3 is a front view of the livestock feeder in a normal feeding position and narrow width setting.
Figure 4:
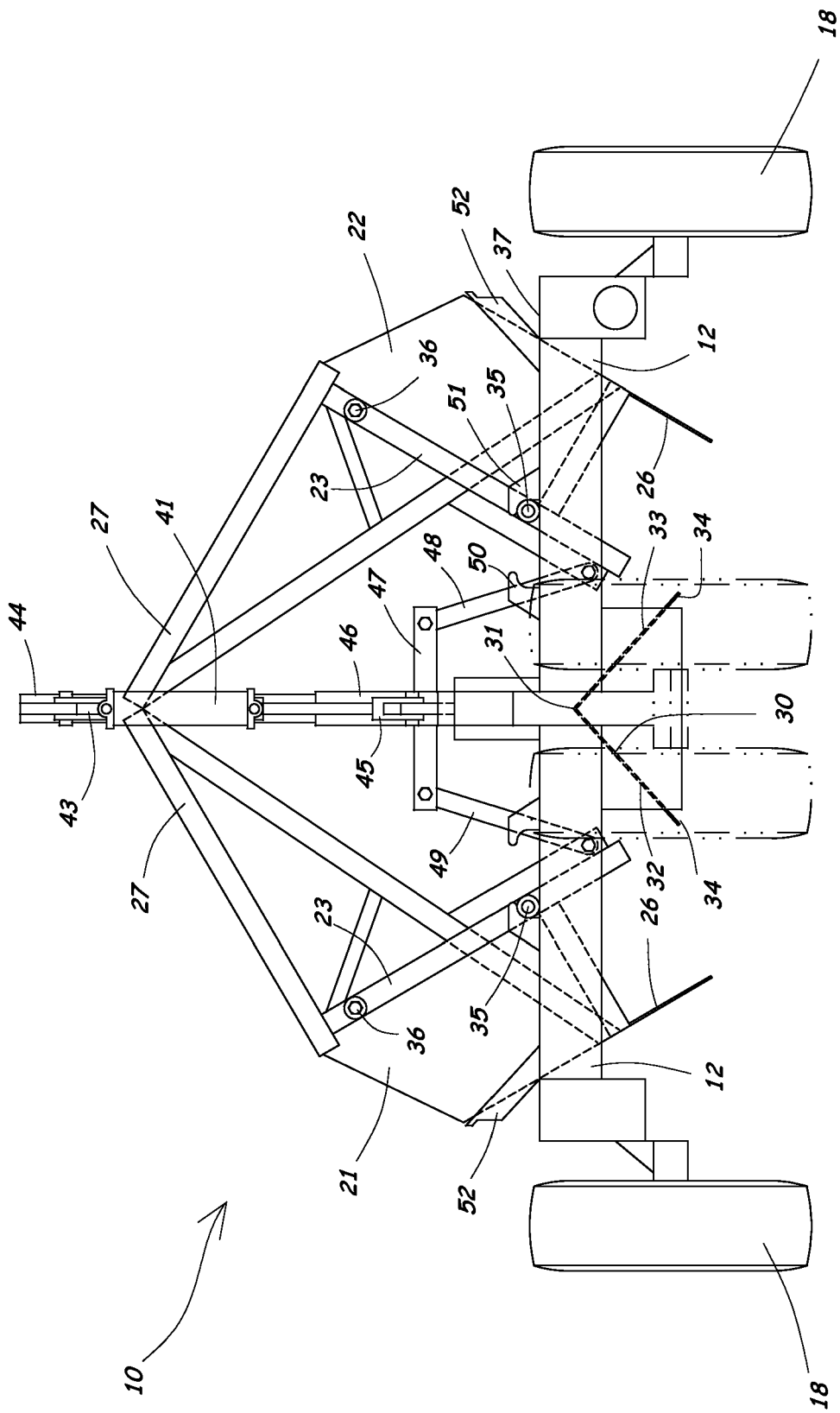
FIG. 4 is a front view of the livestock feeder in a bottom dumping position.

The hydraulic actuator 41 is used to tilt the feed troughs 21, 22 between a normal feeding position, as shown in FIGS. 1 to 3, and a bottom dumping position, as shown in FIG. 4. Specifically, the hydraulic actuator 41 can be retracted to raise the slide member 46 along the mast 44 and thereby raise the feed troughs 21, 22 to their normal feeding position with the floors 26 of the feed troughs 21, 22 engaged against the lower edges 34 of the center deflector 30.

The hydraulic actuator 41 can be extended to lower the slide member 46 along the mast 44 and thereby lower the feed troughs 21, 22 to the bottom dumping position shown in FIG. 4. As shown in FIG. 4, the floors 26 of each of the feed troughs 21, 22 are spaced from the center deflector 30 and slope downwardly and inwardly toward the longitudinal centerline of the feeder for dumping the troughs 21, 22 out the bottom of the feeder. When the slide member 46 is lowered, the feed troughs 21, 22 are forced to pivot about the first pin members 35 at the front and rear ends 12, 13 of the frame 11, and the second pin members 36 are raised above the respective upper surfaces 37, 40 of the front and rear ends 12, 13 of the frame 11. The racks 27 connected to the feed troughs 21, 22 move together with the feed troughs 21, 22.

Figure 5:
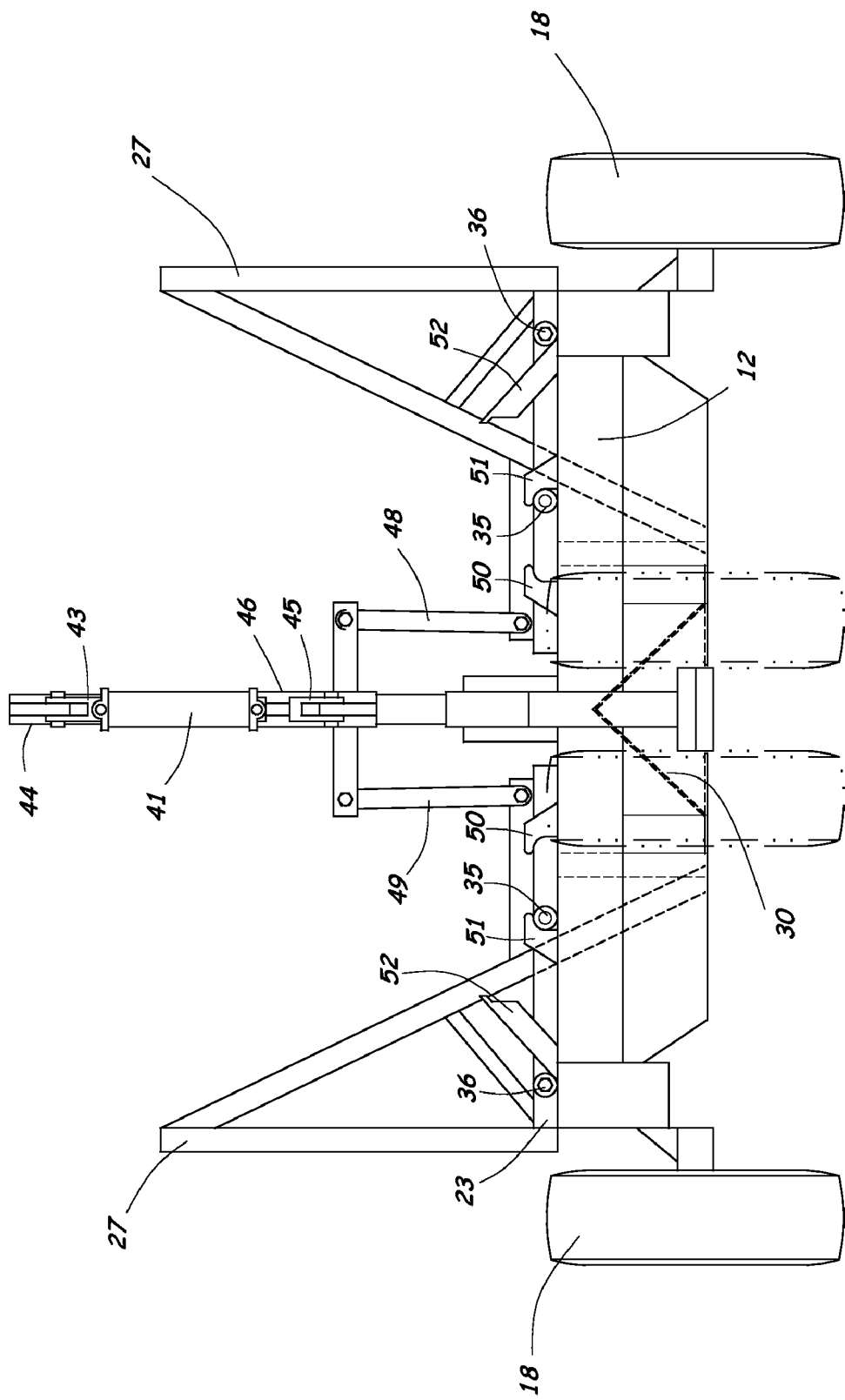
FIG. 5 is a front view of the livestock feeder in a normal feeding position and wide width setting.

The pin members 35, 36 allow both sliding and pivoting movement of the feed troughs 21, 22 on the front and rear ends 12, 13 of the frame 11. First stops 50 are provided on the front and rear ends 12, 13 of the frame 11 for limiting sliding movement of the first pin members 35 in a direction toward the longitudinal center of the feeder 10. Second stops 51 are provided for limiting sliding movement of the first pin members 35 in a direction away from the longitudinal center of the feeder 10. The first and second stops 50, 51 allow the first pin members 35 to move laterally in a controlled range of movement so that the feeder 10 can be adjusted between a narrow width setting (FIGS. 1 to 3) and a wide width setting (FIG. 5).

The linkage 42 connecting the hydraulic actuator 41 to the feed troughs 21, 22 is such that when the feed troughs 21, 22 move from their normal feeding positions to their bottom dumping positions, the pin members 35 also slide from the first stop 50 to the second stop 51.

Cam members 52 are provided on the frame 11 near each of the four corners of the frame 11. Each cam member 52 has a sloped surface 53 arranged to engage the second pin members 36 as the troughs 21, 22 are pivoted between their various positions. The cam members 52 are movable between a first position in which the sloped surfaces 53 are oriented downwardly and inwardly, as shown in FIGS. 1 to 4, and a second position in which the sloped surfaces 53 are oriented downwardly and outwardly, as shown in FIG. 5. For example, the cam members 52 can be connected to the front and rear ends 12, 13 of the frame 11 by pins that allow the cam members 52 to pivot about respective vertical axes near each corner of the frame 11. The cam members 52 at the front and rear ends 12, 13 of the frame 11 are set in the same positions so that the front and rear ends of the troughs 21, 22 are forced in the same direction.

With the cam members 52 in their first position (FIGS. 1 to 4), the second pin members 36 engage the sloped surfaces 53 of the cam members 52 and force the troughs 21, 22 to move inwardly as the troughs 21, 22 are pivoted from their bottom dumping positions into their normal feeding positions. When the second pin members 36 reach the lower extent of the sloped surfaces 53 of the cam members 52 in this position, the first pin members 35 are positioned against the first stops 50. The feeder 10 has thus moved to a narrow width setting to accommodate smaller animals, such as calves or young cattle.

With the cam members 52 in their second position (FIG. 5), the second pin members 36 engage the sloped surfaces 53 of the cam members 52 and force the troughs 21, 22 to move outwardly as the troughs 21, 22 are pivoted from their bottom dumping positions into their normal feeding positions. When the second pin members 36 reach the lower extent of the sloped surfaces 53 of the cam members 52 in this position, the first pin members 35 are positioned against the second stops 51. The feeder 10 has thus moved to a wide width setting to accommodate larger animals, such as cows.

The pin members 35, 36 can be provided with rollers that rotate on the longitudinal axes of the pin members 35, 36 to facilitate smooth operation of the feeder 10 between its various positions.

The construction of a livestock feeder 10 according to the present invention has been described above. A method of using the feeder 10 will now be described to facilitate a full understanding of the invention.

To perform the livestock feeding method of the present invention, a livestock feeder 10 is provided having a frame 11, and first and second feed troughs 21, 22 positioned on each side of a longitudinal center of the frame 11. The first and second feed troughs 21, 22 are pivotable about respective axes between a first position for normal feeding and second position for bottom dumping. The feeder 10 is used to feed livestock with the feed troughs 21, 22 in their first positions by placing feed in or above the troughs 21, 22.

As the troughs 21, 22 are used, the feed and waste materials accumulate in the troughs 21, 22 and need to be cleaned out periodically. The feeder 10 is cleaned out by pivoting the feed troughs 21, 22 to their second positions to dump the contents of the troughs 21, 22 out the bottom of the feeder 10.

When it is desired to adjust a width of the feeder 10, the cam members 52 at the four corners of the feeder 10 are rotated 180 degrees while the troughs 21, 22 are still in their tilted positions (i.e., before the troughs are moved from their bottom dumping positions to their normal feeding positions). The cam members 52 force the feed troughs 21, 22 either inwardly or outwardly to the desired width setting for the feeder 10.

A livestock feeder 10' according to another embodiment of the present invention is illustrated in FIGS. 6 to 10. In this embodiment, spring-loaded cam adjustment assemblies 60 are used instead of the cam members 52 used in the first embodiment. The various other components of the feeder 10', which are the same as in the first embodiment and are labeled with the same reference characters, will not be further described in connection with this embodiment.

Figure 6:
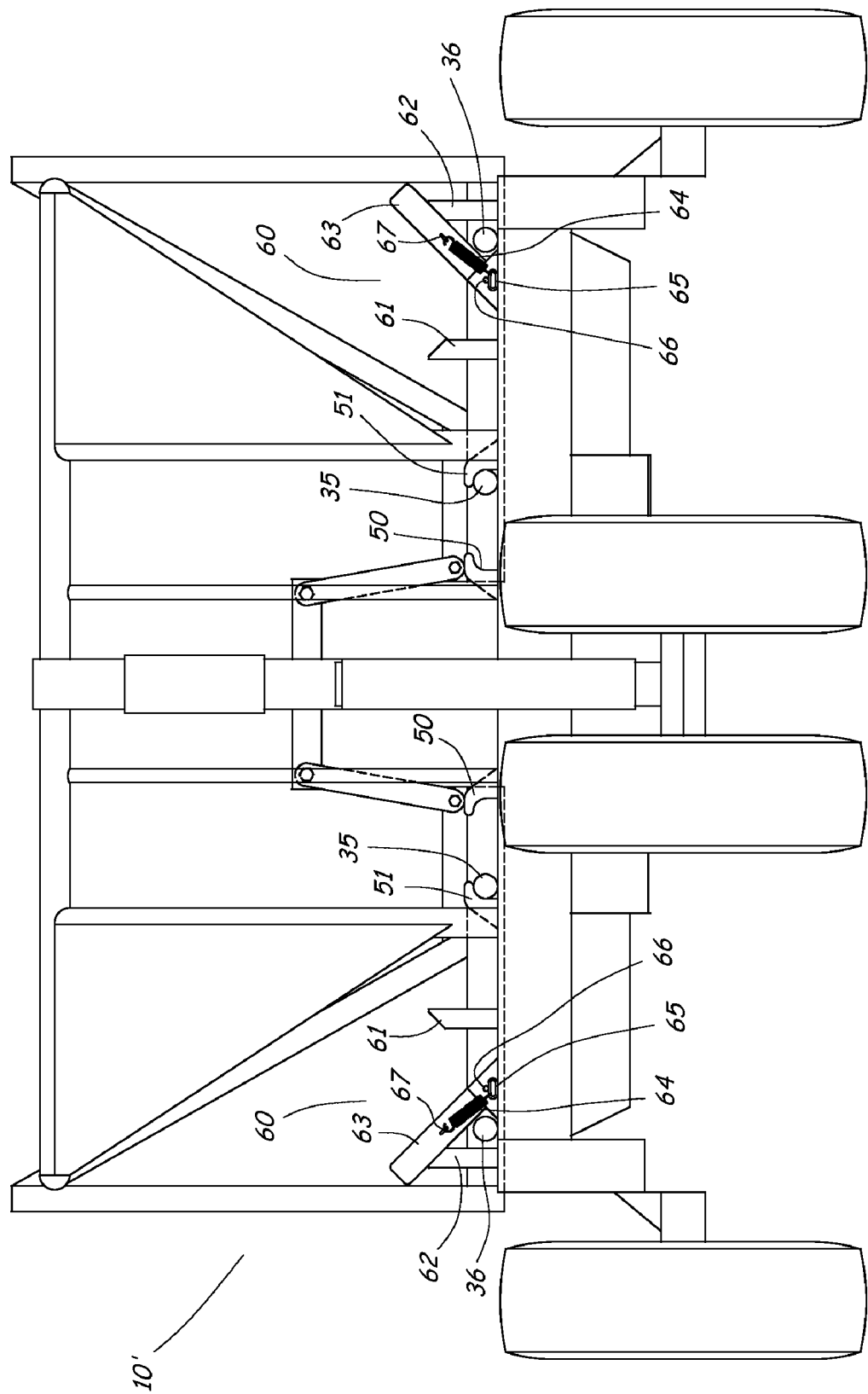
FIG. 6 is a front view of a portable livestock feeder according to another embodiment of the present invention.
Figure 10:
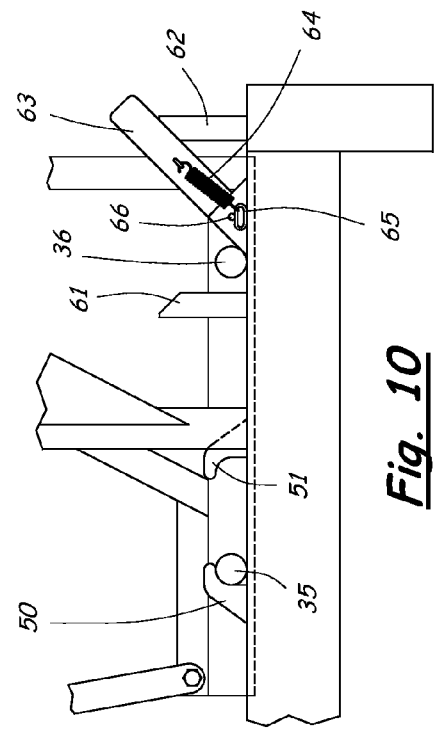
FIG. 10 is a detail front view of the livestock feeder shown in FIG. 6, with the trough moved by the cam adjustment member to a narrow configuration.

The spring-loaded cam adjustment assemblies 60 each include a first inner stop member 61, a second outer stop member 62, and a cam member 63 pivotally connected between the inner and outer stop members 61, 62. The cam member 63 is moveable between a first position in which it engages the inner stop member 61 (FIG. 7), and a second position in which it engages the outer stop member 62 (FIGS. 6, 8 and 10).

A spring 64 is used to bias the cam member 63 toward either the inner stop member 61 or the outer stop member 62 to cause the cam member 63 to move back to its desired setting during pivoting movement of the troughs 21, 22. The spring 64 is connected at its one end to a link 65 that allows a limited amount of sliding movement near the pivot point 66 of the cam member 63, and at its other end to a point 67 on the cam member 63 spaced from the pivot point 66. When the cam member 63 is in its first position engaging the inner stop member 61, the spring 64 is slid to one side of the link 65. In this position, the cam member 63 is spring biased toward the inner stop member 61 until the cam member 63 is manually pivoted to a position closer to the outer stop member 62 than the inner stop member 61. Once the cam member 63 moves over center, the lower end of the spring 64 slides to the other side of the link 65, thereby creating a condition in which the cam member 63 is spring biased toward the outer stop member 62.

Figure 7:
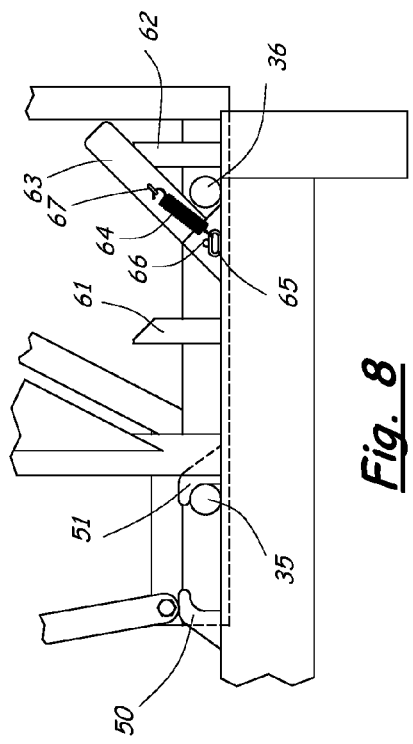
FIG. 7 is a detail front view of a portion of the livestock feeder shown in FIG. 6, with a cam adjustment member in a first position.

The interaction of the cam member 63 with the pin members 35, 36 supporting the front and rear ends of the troughs 21, 22 will now be explained with reference to FIGS. 7 to 10 of the drawings. FIG. 7 shows the cam member 63 in a first position engaging the inner stop member 61. In this position, the feed troughs 21, 22 can be moved between their normal feeding positions and their bottom dumping positions and back again without changing the width of the feeder 10'. The inner pin member 35 will remain at its illustrated position against the outer stop 51, and the outer pin member 36 will be allowed to move back to its position as shown in FIG. 7.

Figure 8:
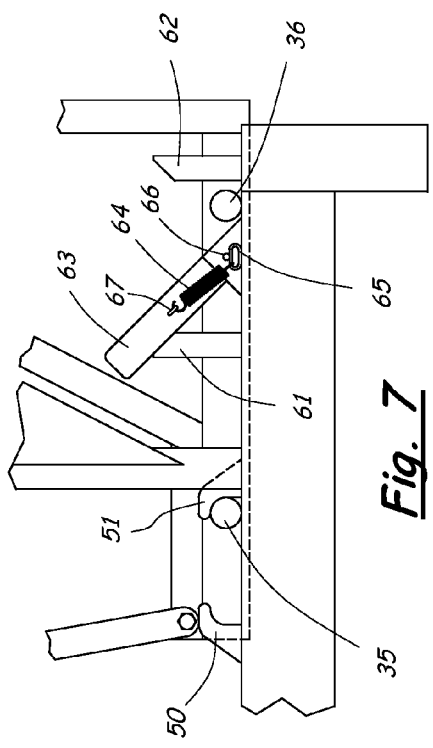
FIG. 8 is a detail front view of the livestock feeder shown in FIG. 6, with the cam adjustment member in a second position.
Figure 9:
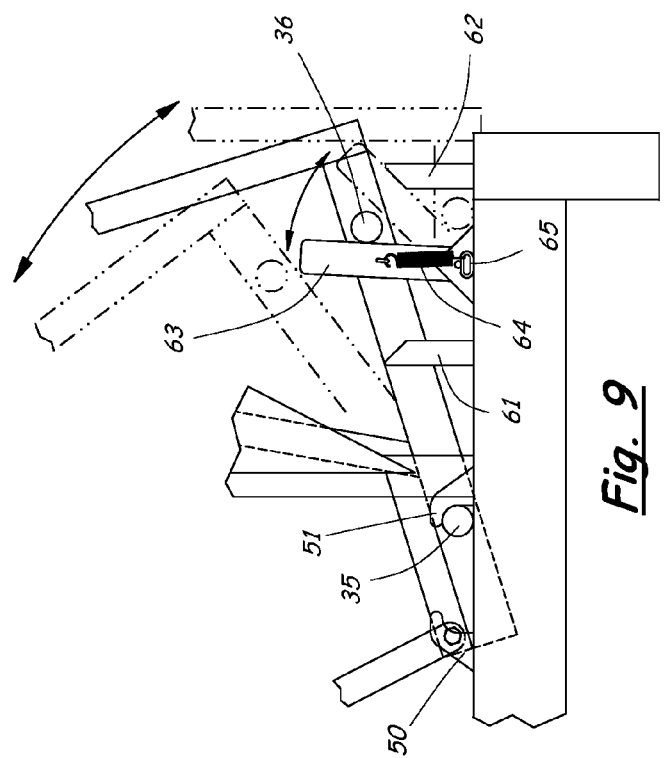
FIG. 9 is a detail front view of the livestock feeder shown in FIG. 6, showing the various positions of the trough as it moves between a normal feeding position and a dumping position.

To change the width of the feeder 10', the cam member 63 is moved from its first position shown in FIG. 7 into its second position against the outer stop member 62, as shown in FIG. 8. In this position, the feed troughs 21, 22 can be moved between their normal feeding positions and their bottom dumping positions with the inner pin member 35 remaining at its illustrated position against the outer stop 51, as shown in FIG. 9. As the outer pin member 36 moves upwardly with the feed trough 21, 22, the pin member 36 pushes against the bottom of the cam member 63 and causes the cam member 63 to raise upwardly. However, the outer pin member 36 moves past the cam member 63 before the cam member 63 pivots past center. The spring 64 then biases the cam member 63 to return back to its position against the outer stop member 62. When the feed trough 21, 22 is moved from its bottom dumping position into its normal feeding position, the pin member 36 engages the top of the cam member 63 and is guided downwardly and inwardly along the cam member 63, as illustrated in FIG. 10. The movement of the pin member 36 along the cam member 63 causes the trough 21, 22 to move inwardly until the inner pin member 35 engages the inner stop 50.

To adjust the width of the feeder 10' from its narrow setting to its wide setting, the cam member 63 is simply pivoted from its position against the outer stop member 62 into its position against the inner stop member 61, and the feed trough 21, 22 is moved from its normal feeding position to its bottom dumping position and then back again to its normal feeding position. During this movement, the pin member 36 interacts with the cam member 63 to force the trough 21, 22 to its wide setting in the manner described above.

Figure 11:
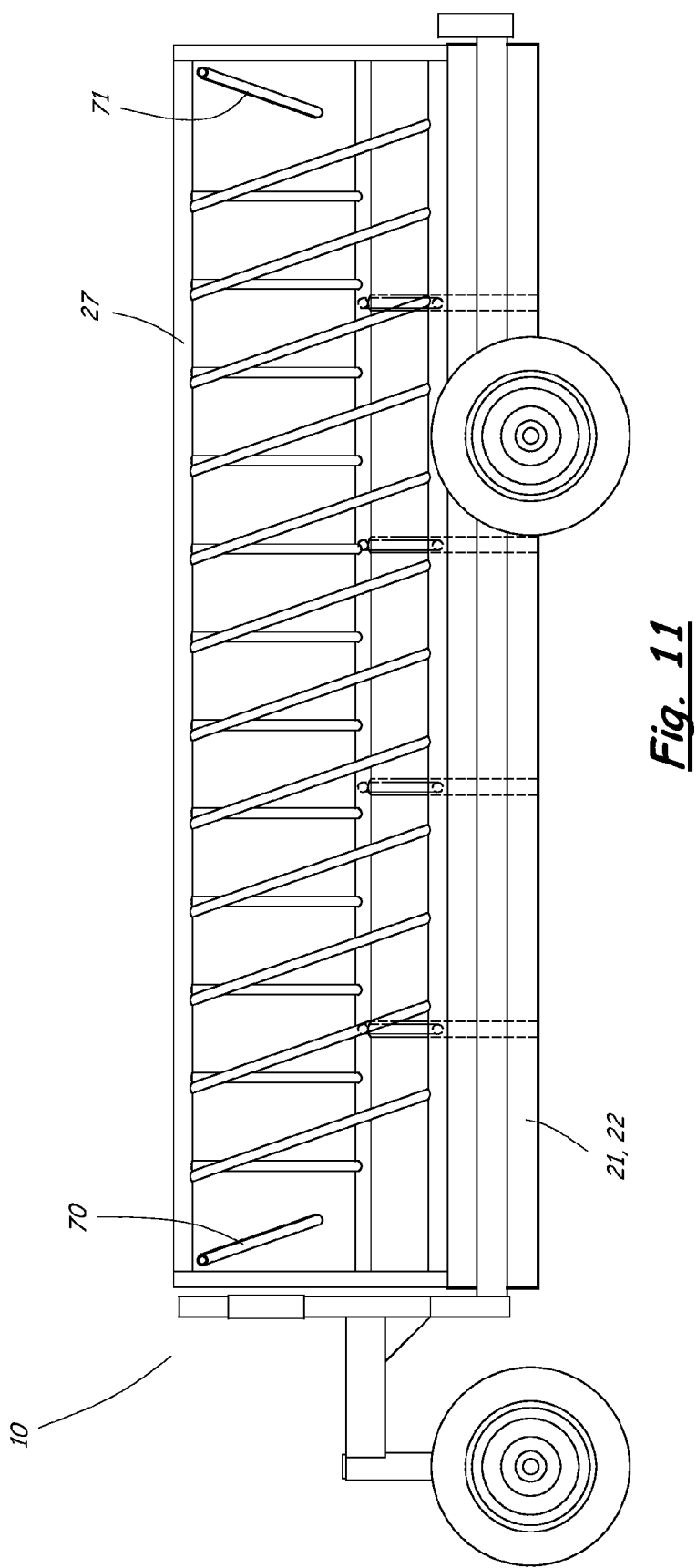
FIG. 11 is an elevation view of the livestock feeder according to the present invention, with removable end panels positioned in the rack for directing loose feed into the troughs.

FIG. 11 shows the livestock feeder 10 equipped with optional end panels 70, 71 at the front and rear ends of the racks 27 above the feed troughs 21, 22. The end panels 70, 71 are sloped downwardly and inwardly into the feed troughs 21, 22 and are used for directing loose feed into the troughs 21, 22. The end panels 70, 71 are removable from the feeder 10 when they are not needed. For example, the end panels 70, 71 can be removed from the feeder to increase the capacity of the racks 27 for holding hay.

The present invention has been described in connection with exemplary embodiments in which the apparatus is a livestock feeder 10, 10'. However, it should be appreciated that other embodiments of the invention can also be made. For example, a bottom dumping transport apparatus can be made for transporting yard waste, and so forth.

It should also be understood that the frame of the feeder can have a configuration other than the frame 11 illustrated in the drawings. For example, the sides 14, 15 of the frame 11 can be replaced by a single main beam extending along the center of the feeder. The position and linkage of the hydraulic actuator can also be changed to other configurations that would accomplish the same movement of the feed troughs 21, 22.

While the invention has been specifically described in connection with specific embodiments thereof, it is to be understood that this is by way of illustration and not of limitation, and the scope of the appended claims should be construed as broadly as the prior art will permit.

What is claimed is:

1. A livestock feeder, comprising:
   a pair of feed troughs positioned on opposite sides of a longitudinal centerline of the feeder, each of said feed troughs supported at opposite ends by a pivot structure, and each of said feed troughs having an outer side wall and a floor for holding loose livestock feed or the like in the feed troughs;
   a center deflector extending along the longitudinal centerline of the feeder between the pair of feed troughs;
   a pair of racks positioned with one rack above each of the feed troughs, said racks comprising a plurality of spaced members for holding hay above the troughs; and
   a means for tilting the feed troughs between a normal feeding position in which the floors engage the center deflector to hold feed within the troughs, and a tilted position in which the floors are spaced from the center deflector and slope downwardly and inwardly toward the longitudinal centerline of the feeder for dumping the troughs out the bottom of the feeder.

2. The livestock feeder according to claim 1, wherein said tilting means comprises a hydraulic actuator for tilting the feed troughs between said normal feeding position and said tilted position for dumping.

3. The livestock feeder according to claim 1, further comprising a means for adjusting a width of the feeder to accommodate different sizes of animals.

4. The livestock feeder according to claim 1, further comprising a frame supported by a plurality of wheels, and a hitch structure located at one end of the frame for towing the feeder.

5. The livestock feeder according to claim 1, wherein said tilting means comprises an actuator that forces the feed troughs to pivot about said pivot structures.

6. The livestock feeder according to claim 5, wherein said pivot structures at each end of the feed troughs are laterally movable between a first position in which the feeder has a narrow width setting, and a second position in which the feeder has a wide width setting.

7. The livestock feeder according to claim 1, wherein the center deflector comprises an apex extending in a longitudinal direction of the feeder, tapered surfaces that extend downwardly and outwardly from the apex, and lower edges, and wherein said feed troughs each comprises a floor portion that contacts a respective one of the lower edges of the center deflector when the feed trough is in its normal feeding position.

8. The livestock feeder according to claim 1, wherein said feed troughs and said racks are rigidly connected together so that said racks pivot with said feed troughs when the feed troughs are tilted for bottom dumping.

9. The livestock feeder according to claim 1, further comprising a cam assembly associated with each of said feed troughs, each cam assembly comprising a cam member movable between first and second positions to engage a respective one of said feed troughs and alter its width setting, said cam members being arranged in said first position to cause said troughs to move to a narrow width setting, and said cam members being arranged in said second position to cause said troughs to move to a wide width setting.

10. The livestock feeder according to claim 9, wherein said cam members each comprises a first cam member positioned near a front end of the respective feed trough, and a second cam member positioned near a rear end of the respective feed trough, whereby the front and rear ends of the feed troughs are caused to move simultaneously with each other between the narrow and wide width settings.

11. The livestock feeder according to claim 10, wherein said feed troughs are each supported by two laterally spaced pin members at its front end and two laterally spaced pin members at its rear end.

12. The livestock feeder according to claim 11, wherein a first one of the pin members at each of the front and rear ends of each feed trough is movable between a respective first stop that limits lateral movement of the feed trough in a first direction, and a respective second stop that limits lateral movement of the feed trough in a second direction opposite from the first direction, and wherein a second one of the pin members at each of the front and rear ends of each feed trough is arranged to engage a respective one of the cam members.

13. The livestock feeder according to claim 12, further comprising a hydraulic actuator connected via a linkage to each of the feed troughs, said hydraulic actuator being movable between a first position in which the feed troughs are both held in their normal feeding positions, and a second position in which the feed troughs are both simultaneously tilted to their tilted positions to dump out the bottom of the feeder.

14. The livestock feeder according to claim 12, wherein each of said cam members comprises a sloped surface engaged by a respective second one of the pin members, said sloped surfaces being arranged to slope downwardly and inwardly when the cam members are in their said first positions, and said sloped surfaces being arranged to slope downwardly and outwardly when the cam members are in their said second positions.

15. The livestock feeder according to claim 14, wherein each of said cam members are arranged to pivot about respective vertical axes to move said cam members between their first and second positions.

16. The livestock feeder according to claim 14, wherein each of said cam members are arranged to pivot about respective longitudinal axes to move said cam members between their first and second positions.

17. The livestock feeder according to claim 16, wherein each of said cam members are biased toward their first and second positions by a spring.

18. A portable livestock feeder, comprising:
a frame supported by a plurality of wheels with a trailer hitch at one end;
first and second feed troughs positioned on each side of a longitudinal center of the frame, each of said feed troughs supported at opposite ends by a pivot structure, and each of said feed troughs having an outer side wall and a floor;
a pair of racks positioned with one rack above each of the feed troughs, said racks comprising a plurality of spaced members for holding hay above the troughs;
a center deflector extending along a longitudinal centerline of the feeder between said first and second feed troughs;
said first and second feed troughs being pivotable about respective longitudinal axes between a first position for normal feeding in which the floors engage the center deflector to hold feed within the troughs, and a second position for bottom dumping in which the floors are spaced from the center deflector and slope downwardly and inwardly toward a longitudinal centerline of the feeder for dumping the troughs out the bottom of the feeder; and
a mechanism for moving the first and second feed troughs between their first and second positions.

19. The portable livestock feeder according to claim 18, wherein said first and second feed troughs are each supported at their front ends by a first pair of laterally spaced pin members and at their rear ends by a second pair of laterally spaced pin members.

20. The portable livestock feeder according to claim 19, wherein a first one of the pin members at each of the front and rear ends of the feed troughs is movable between a first stop fixed on said frame that limits lateral movement of the respective feed trough in a first direction toward the longitudinal centerline of the feeder, and a second stop fixed on said frame that limits lateral movement of the respective feed trough in a second direction away from the longitudinal centerline of the feeder.

21. The portable livestock feeder according to claim 20, further comprising a cam member located at each of the front and rear ends of the feed troughs, wherein a second one of the pin members at each of the front and rear ends of the feed troughs is arranged to engage a respective one of the cam members when the feed troughs are moved between their first and second positions.

22. The portable livestock feeder according to claim 21, wherein said cam members are each movable between first positions for causing said troughs to move toward the longitudinal centerline of the feeder to a narrow width setting, and second positions for causing said troughs to move away from the longitudinal centerline of the feeder to a wide width setting.

23. The portable livestock feeder according to claim 22, further comprising a hydraulic actuator connected via a linkage to each of the feed troughs, said hydraulic actuator being movable between a first position in which the feed troughs are both held in their first positions for normal feeding, and a second position in which the feed troughs are both simultaneously tilted to their second positions for dumping out the bottom of the feeder.

* * * * *